US007466913B2

United States Patent
Saniee et al.

(10) Patent No.: US 7,466,913 B2
(45) Date of Patent: *Dec. 16, 2008

(54) METHOD FOR WDM OPTICAL NETWORKS INCLUDING ALTERNATE ROUTES FOR FAULT RECOVERY

(75) Inventors: Iraj Saniee, New Providence, NJ (US); Eric Bouillet, Eatontown, NJ (US); Gang Liu, Denver, CO (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/245,597

(22) Filed: Oct. 7, 2005

(65) Prior Publication Data

US 2006/0039696 A1    Feb. 23, 2006

Related U.S. Application Data

(63) Continuation of application No. 09/805,021, filed on Mar. 12, 2001, now Pat. No. 7,058,296.

(51) Int. Cl.
  *H04J 14/00* (2006.01)
(52) U.S. Cl. ......................................... 398/3
(58) Field of Classification Search .................. 398/3, 398/5, 47; 370/258, 458
See application file for complete search history.

(56) References Cited

U.S. PATENT DOCUMENTS 5,515,367 A * 5/1996 Cox et al. ............... 370/404

OTHER PUBLICATIONS

S. Ramamurthy et al., "Survivable WDM Mesh Networks, Part I—Protection", IEEE, 1999.*
K. Park et al., "Wavelength Converter Location and Optical Fiber Dimensining for Limited Channel Convertible Optical Network", IEEE, 1998.*

* cited by examiner

*Primary Examiner*—Shi K Li

(57) ABSTRACT

A procedure for designing WDM optical networks provides both working circuits and protection circuits for carrying traffic demands between node pairs. The protection circuits are activated for the purpose of network recovery in case of a fault on a working circuit. Each protection circuit is link-disjoint, and preferably node-disjoint, from its corresponding working circuit. The network is subdivided into logically defined rings, such that each working and protection circuit lies on one or more of the rings. In particular embodiments of the invention, the joint routing of circuits is carried out so as to minimize the total length of the working and protection circuits according to a length that includes a weight for each link. The weight is selected to promote the efficient packing of optical fibers with wavelength channels.

4 Claims, 10 Drawing Sheets

LEGEND

FIG. 3

|   | 1 | 2 | 3 | 4 | 5 | 6 | 7 | 8 |
|---|---|---|---|---|---|---|---|---|
| 1 | 0 | 0 | 2 | 1 | 1 | 2 | 1 | 2 |
| 2 | 0 | 0 | 0 | 1 | 3 | 16 | 1 | 4 |
| 3 | 2 | 0 | 0 | 5 | 1 | 1 | 0 | 0 |
| 4 | 1 | 1 | 5 | 0 | 2 | 2 | 0 | 0 |
| 5 | 1 | 3 | 1 | 2 | 0 | 13 | 0 | 0 |
| 6 | 2 | 16 | 1 | 2 | 13 | 0 | 24 | 7 |
| 7 | 1 | 1 | 0 | 0 | 0 | 24 | 0 | 14 |
| 8 | 2 | 4 | 0 | 0 | 0 | 7 | 14 | 0 |

METHOD FOR WDM OPTICAL NETWORKS INCLUDING ALTERNATE ROUTES FOR FAULT RECOVERY

CROSS REFERENCE TO RELATED APPLICATIONS

This application is a continuation of U.S. application Ser. No. 09/805,021, filed Mar. 12, 2001 now Pat. No. 7,058,296.

FIELD OF THE INVENTION

This invention relates to methods for designing WDM optical networks, and more particularly to the efficient design of WDM optical networks able to recover from network faults by the re-routing of demands onto protection circuits.

ART BACKGROUND

Optical fiber networks are growing in importance as a medium for both short-haul and long-haul communications. One category of optical fiber networks consists of dense wavelength-division multiplexed (DWDM) optical networks. In a DWDM network, each optical fiber carries data in each of many distinct wavelength channels. With present technology, it is feasible for each fiber to carry eighty or more such channels. At the various nodes of the network, wavelength-selective optical elements are used to combine traffic from disparate sources onto a single fiber, and from a single fiber, to distribute traffic for disparate destinations into distinct fibers.

After a connection between a given source node and a given destination node has been established, the connection will typically traverse a route through zero, one, or plural intermediate nodes and through the optical fiber links connecting the source, intermediate, and destination nodes. The number of possible alternative routes for calls between a given source-destination pair depends upon the number of intermediate nodes, and upon the connectivity of the network; i.e., on the number of links converging on or diverging from each node. If the network is highly connected and the number of intermediate nodes is permitted to be large, e.g. on the order of ten or more, the number of alternative routes for a given call can be quite large.

In particular, flexibility in the routing, as well as the re-routing, of calls is afforded by the use of an optical element known as an Optical Cross-Connect (OXC). An OXC, which is typically deployed at an intermediate node, is used to pass transmissions between incoming and outgoing optical fibers. Through the use of an OXC, any one of a plurality of incoming fibers can be connected to any one of a plurality of outgoing optical fibers. If the OXC is used in tandem with wavelength converters, a given message can not only be switched from fiber to fiber, but also from one wavelength channel to another.

In one known OXC arrangement, for example, incoming transmissions from one or more fibers are wavelength demultiplexed into single-wavelength-channel signals, each on a separate input fiber. Then, wavelength converters are used to place each single-wavelength-channel signal onto a common working wavelength for the OXC. The OXC then couples each of the single-wavelength-channel signals, at the working wavelength, into a respective output fiber. Then, wavelength converters are used to place each signal on a respective output wavelength channel, which is not necessarily the channel on which that signal arrived. Finally, the output signals are wavelength multiplexed onto communication fibers for further transmission through the network.

Although many alternative routes may be available for calls between a given source node and a given destination node (to be referred to jointly as a "source-destination (S-D) pair"), it is often advantageous to limit the routing to only one or only a few of the possible routes. Route sets are often chosen, for example, on the basis of hop count or link count; i.e., the total number of links. To keep total accrued delay within reasonable limits, it is often desirable to limit route sets to those routes having the lowest link counts.

The term "network design" as used herein means the layout of the physical elements of a network, such as the fibers and OXCs, together with the prescribed route sets that avail themselves of those physical elements in order to meet a pre-specified set of connections or calls. A design may be static or dynamic. If dynamic, the design may be subject to periodic revision. The physical layout might be revised, for example, at periods measured in months or years. The route sets, on the other hand, could be revised on periods of, e.g., a week, day, hour, or even smaller unit of time.

A network design is economically efficient if it accommodates substantially all of the traffic demand, but does not, on average, have a substantial amount of unused capacity. To promote economic efficiency, it is advantageous when planning an initial or revised network design to consider the physical layout and the route sets together, in view of measured or anticipated demands. There is still a need for computationally tractable design procedures that take such an approach to achieving economic efficiency.

SUMMARY OF THE INVENTION

We have devised a new network design procedure. Our procedure tends to produce economically efficient network designs. Significantly, the networks designed according to our procedure include both working circuits and protection circuits for carrying traffic demands between S-D pairs of nodes. A "circuit" is a succession of one or more wavelength channels in series, one such channel assigned to each link of a path from the origin node to the destination node of an S-D pair. Each S-D pair between which there is traffic demand is connected by both a working circuit and a protection circuit. The protection circuit is link-disjoint, and preferably node-disjoint, from the working circuit. If a working circuit should fail, the protection circuit will be available to carry the demand. Thus, the network can recover from a fault in the working circuit by switching traffic to the protection circuit. Significantly, the working and protection circuits for a given S-D pair together form a logically defined ring within the network.

Accordingly, the invention in a broad aspect involves a method of routing a plurality of demands in a network. Elements of the method include logically subdividing the network into a plurality of rings; assigning to each demand a ring that contains both end nodes of the demand; and assigning to each demand a working path and a protection path along the ring from the source node to the destination node, wherein the protection path is link-disjoint from the working path.

In a second aspect, the invention involves a method of network recovery. That is, upon detection of a failure along a working path of the network, at least one demand previously routed on the defective working path is re-routed on a selected protection path. The protection path is selected from a predetermined list. The predetermined list is compiled by applying the routing method discussed above and described below in further detail as to exemplary embodiments thereof.

Our invention encompasses several different approaches to the problem of network design. In one approach, which we refer to as Dedicated Protection (DP), the wavelengths assigned to a protection circuit are dedicated to the corresponding S-D pair and are not shared with the protection or working circuits of any other S-D pair. In certain other approaches, which we refer to collectively as "Shared Protection on Logical Rings," the S-D pairs are again grouped into logical rings, but non-overlapping demands on the same ring are permitted to share wavelength channels for their protection paths. More precisely, a group of non-overlapping demands on the same ring can be protected by a single protection channel on the ring.

BRIEF DESCRIPTION OF THE DRAWINGS

FIG. 3 is an illustrative, hypothetical demand matrix for the network of FIG. 1.

FIG. 7 refers to a cost function, but is not limited to any particular choice of such function.

DETAILED DESCRIPTION

A. Dedicated Protection

Figure 1:
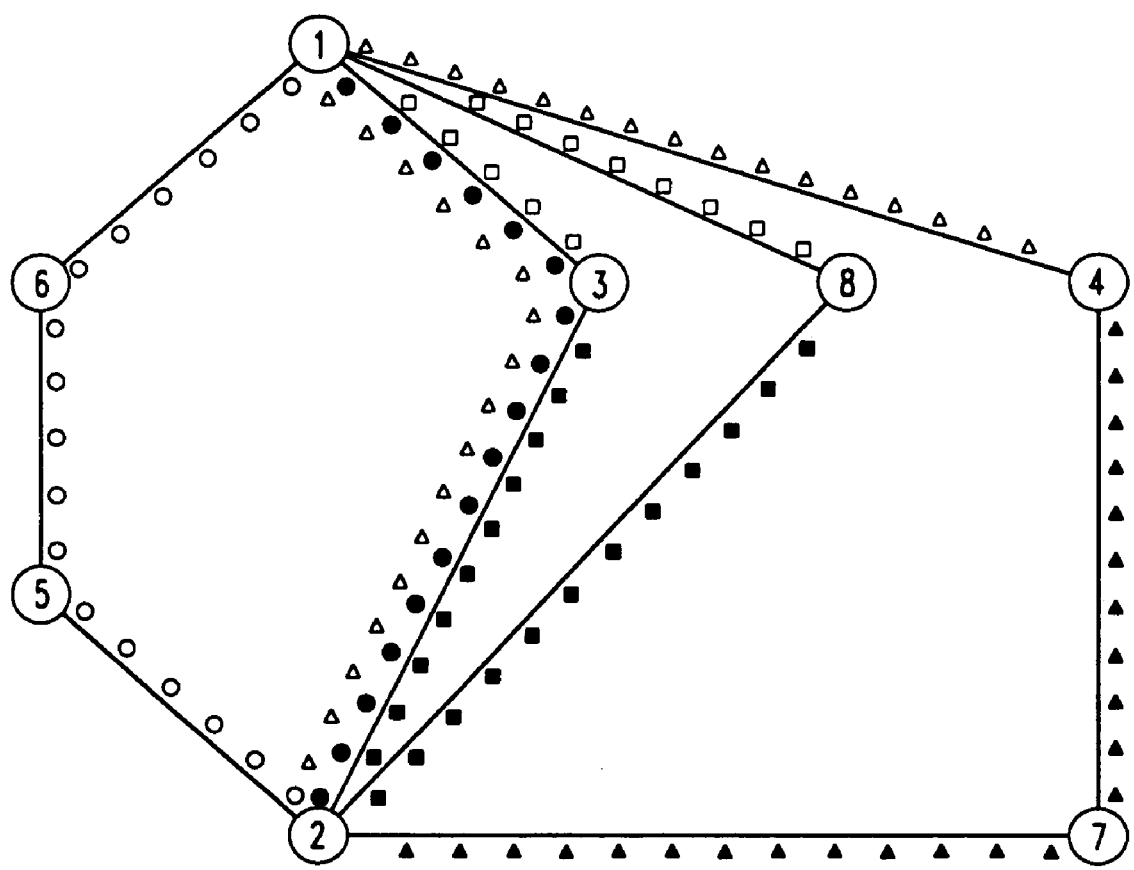
FIG. 1 is a schematic diagram of a simplified WDM optical network in which working and protection circuits are defined in accordance with the present invention in one embodiment.
Figure 1:
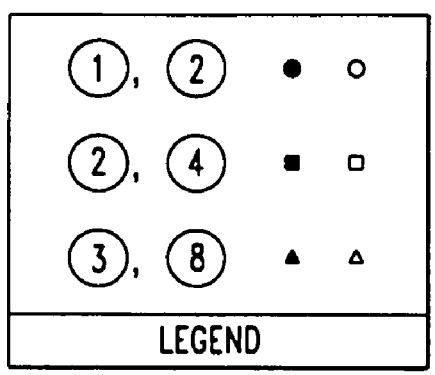

An object of the present invention is to design networks in which each given demand has not only a working route from a source node to a destination node, but also a protection route that can be activated in case any link or node fails along the working route. In the Dedicated Protection strategy, which we describe first, a wavelength channel must be dedicated solely to the given demand on each link of the protection route. Preferably, the protection route should share neither links nor intermediate nodes with the working route. If sharing of nodes is unavoidable, then the working and protection routes should still be disjoint as to links.

In a broad aspect, our design procedure for a network having Dedicated Protection involves mapping traffic demands to selected pairs of routes that are at least link-disjoint, and preferably also node-disjoint. Thus, the network can recover from any failure of the working path by re-routing on the provisioned protection path without any need to localize the failure.

One such mapping is typically carried out for each full (or remaining partial) unit of demand, as measured in terms of the capacity of one wavelength channel on one fiber. One exemplary such unit is the capacity of one OC-192 line. For brevity, a wavelength channel on a single fiber will be referred to, below, as a "λ-channel."

The selection of a route pair is carried out in such a way as to favor route pairs having a relatively low, and preferably a least, value of a length function. The length function advantageously includes a weighted link count, in which each link has a respective weight based, at least in part, on the length of the link, the number of wavelength channels currently assigned to that link, and the number of ports or optical termination units (OTUs) installed at the two endnodes of the link. The weight is advantageously selected to have a relatively large value when the channels in the fibers of the given link are fully utilized, or when the OTUs or the ports in the OXCs at the end nodes of the given link are fully utilized. When the fibers on the given link have some available channels or the OXC's at the end nodes have, e.g., some available ports, the weight is advantageously selected to have progressively smaller values as the number of currently occupied channels or ports increases. The selection of route pairs is advantageously carried out jointly over all of the S-D pairs between which there is demand.

Certain embodiments of the invention include a further step of "coloring" the route pairs; i.e., of assigning specific wavelength channels to the respective links of the routed working and protection paths, thus to define working and protection circuits. In some cases, wavelength continuity may be imposed; i.e., a given working or protection circuit must be assigned the same wavelength channel on all links. In other cases, the same circuit may be assigned different wavelength channels on different links. However, the channel assignment is made in such a way that no two circuits will share the same λ-channel on the same fiber of the same link.

Working and protection routes are illustrated in FIG. 1. Shown schematically in the figure is a simplified network consisting of the nodes numbered 1-8, and the links (not numbered) interconnecting the nodes. Filled symbols (circle, triangle, square) in the figure indicate working routes, and open symbols indicate protection routes. It will be seen from the figure that S-D pair (1,2) is connected via the working route 1-3-2 and via the protection route 1-6-5-2. Similarly, it will be seen that S-D pair (2,4) is connected via the working route 2-7-4 and via the protection route 2-3-1-4. Finally, it will be seen that S-D pair (3,8) is connected via the working route 3-2-8 and via the protection route 3-1-8.

It will be evident from the figure that links can be shared among various working and protection routes. For example, link 1-3 is shared by the working route for (1,2) and the protection routes for (2,4) and (3,8). In fact, individual optical fibers on a link can be shared in this manner. However, within a given link, only one route is permitted to occupy a given wavelength channel. Often, the same wavelength channel will be used on all links of the working and protection routes for a given demand. However, the wavelength channel may in some cases differ between the working and protection routes. Moreover, if wavelength conversion is available, the wavelength channel assigned to a given demand may vary from one link to another.

Various factors affect the cost of a network design. These factors include the cost to acquire and install optical fiber, and the cost of optical elements. The installation cost for a new optical fiber is here envisaged as including the cost of upgrading the associated OXCs to provide interconnection for that fiber. The optical elements include light sources and detectors at the fiber terminations, and also optical regenerators if needed. An additional investment in such elements is needed for each further wavelength channel that is added to a fiber.

Since the cost of an optical fiber grows with its length, economic efficiency generally favors routes having relatively short geographical lengths. However, other factors also affect economic efficiency. For example, the cost of acquiring and installing each new fiber is independent of the number of wavelength channels occupying that fiber. Therefore, a network of relatively few fibers, well packed with wavelength channels, is more cost-effective than a network of many sparsely occupied fibers. In effect, cost efficiency is benefitted when the installation cost of each fiber is spread over many wavelength channels; i.e., over many demands routed through that fiber.

An automated procedure for routing demands through the network will typically prefer routes having a least value of some cost function. For example, minimum hop routing procedures simply select, from the routes available to a given demand, that route having the least hop count. The corresponding cost function may be envisaged as a weighted link count in which the link weights are all unity. More complicated link weights have also been described, such as weights that increase as the corresponding links become more congested.

We have devised a cost function that uses a new kind of link weight. In contrast to link weights of the prior art, our link weight is designed to at least partially deter the addition of a new fiber if it is possible to route a demand on fibers that have already been designated for installation. Such deterrence is achieved by including in the cost function a penalty that is greatest when a new fiber is to be selected for routing a demand, and that decreases progressively with the number of wavelength channels that already occupy the selected fiber. Further details of our cost function are presented below.

Figure 2:
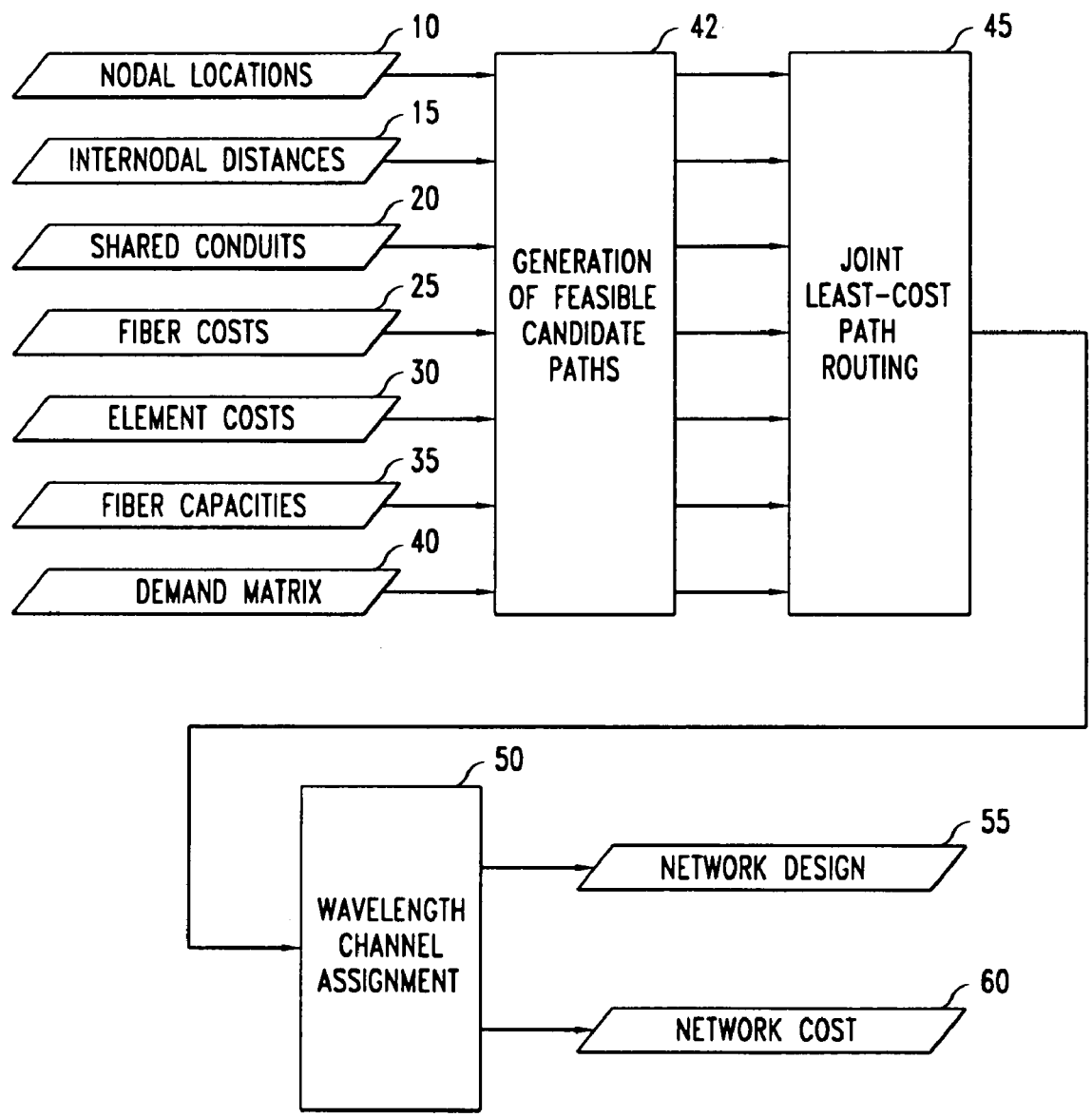
FIG. 2 is a high-level conceptual block diagram of the invention in one embodiment.

A greater appreciation of our invention may be had by referring to FIG. 2. As shown in the figure, the inputs to our network design procedure will typically include a specification of the nodal locations (box 10) and the internodal distances (box 15). These specifications are useful, inter alia, for computation of fiber lengths which, when multiplied by the cost per unit length of fiber, give at least a portion of the fiber costs. The connectivity of the network can also be specified through the internodal distances, by specifying a very large distance, i.e., an effectively infinite distance, between each pair of unconnected nodes.

It sometimes happens, in the physical installation of optical fiber networks, that distinct links, i.e., links connecting different node pairs, share a common underground conduit, or are otherwise emplaced with a common risk of accidental damage. When there are such shared risks, there is a relatively high likelihood that when one link in the shared risk group is damaged, other links in that group will also be damaged. In such cases, it is desirable to take steps that avoid routing both the working route and the protection route of a demand through, e.g., the common conduit. One way to deter such common routing of working and protection paths is to specify in the input to the design procedure that all demand routed through the conduit is passing through a common link. Such a common link is "artificial" in the sense that it is part of the description of the computational problem, but need not have a physical counterpart. In FIG. 2, data specifying the presence of shared conduits are represented by box 20.

Typical inputs to the network design procedure also include fiber costs (box 25), including the cost per unit length of fiber and the associated cost of modifying the OXCs. Also included in the typical inputs are the costs of optical elements (box 30), such as single-wavelength-channel light sources, detectors, and regenerators. Also included are fiber capacities (box 35); i.e., the number of wavelength channels that can be carried per fiber.

The typical inputs to the design procedure also include a matrix of demands $d_{ij}$ from the i'th origination node to the j'th destination node, in which i and j range over all nodes in the network. (Self demands $d_{ij}$ are generally set to zero.) The values assigned to the elements of the demand matrix may be based, for example, on theoretical predictions, historical data, or recent measurements. An illustrative demand matrix for the eight-node network of FIG. 1 is presented in FIG. 3. In FIG. 2, the input matrix of demands $d_{ij}$ is represented by box 40.

With further reference to FIG. 2, it is seen that a procedure referred to as "Joint Least-Cost-Path Routing" is carried out (block 45) using data from at least some of the inputs 10-40. In the procedure of block 45, routes are selected for all of the demands specified in input 40. The route selection is "joint" in the sense that the routing of each demand is responsive to the routing of the other demands. The routing is "least-cost-path (LCP)" in the sense that of the routes available for a given demand, that route is preferred that has a least value of a cost function. Details of an exemplary cost function are presented below.

As indicated at block 50 of FIG. 2, the LCP routing is followed, in exemplary embodiments of the invention, by a procedure for assigning one or more specific wavelength channels to each of the selected routes. As further indicated in the figure, performance of the design procedure, in exemplary embodiments, leads to a network design (box 55) and a calculated network cost (box 60).

Figure 4:
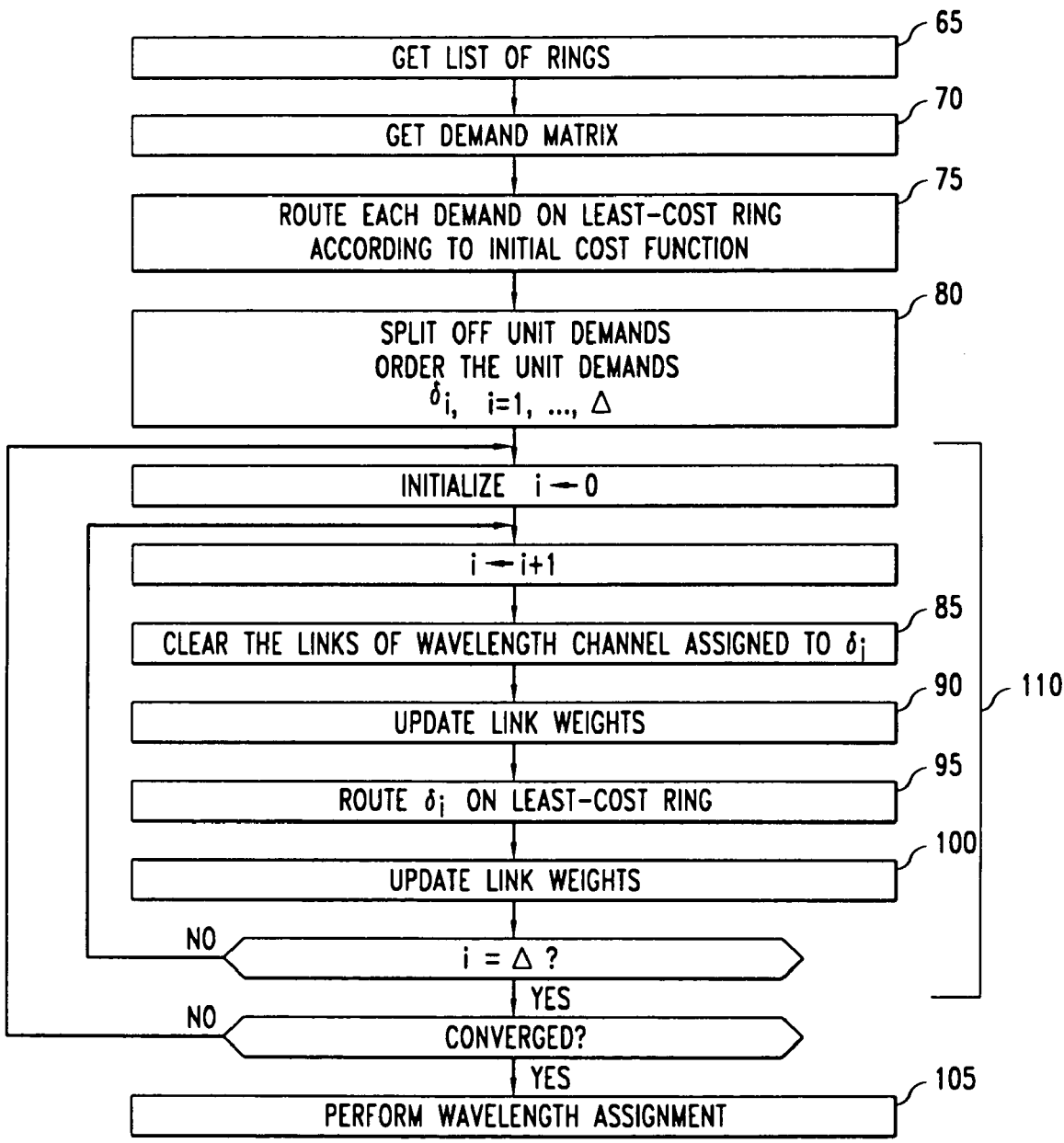
FIG. 4 is a flowchart of an exemplary procedure for Joint Shortest-Path Routing according to the invention in one embodiment.

FIG. 4 includes an expanded view of an exemplary Joint LCP Routing procedure as summarized by block 45 of FIG. 2. At block 70 of FIG. 4, the matrix of demands $d_{ij}$ between each S-D pair ij is obtained. At block 75, each demand is routed on a route pair, or "ring," which consists of a working path and a protection path. The working and protection paths for a given demand are required to be node-disjoint or link-disjoint; i.e., they must have no common intermediate nodes or common links, respectively. (The absense of common intermediate nodes implies the absence of common links.)

It should be noted that node-disjoint paths can protect against both node failure and link failure, whereas paths that are only link-disjoint will not protect against all node failures. Consequently, node-disjoint paths are preferred over merely link-disjoint paths. However, in cases in which suitable node-disjoint paths cannot be found, it is still useful to employ link-disjoint paths.

Each pair of link- or node-disjoint paths is selected according to a shortest-path routing criterion applied to the total length of the pair. That is, the total length is the sum of the lengths of the working and protection paths. In subsequent steps, as explained below, the cost function used to compute the pair length will depend upon the occupancy of each link of the pair. However, in the initial routing represented by block 75, the cost function may, for example, assume that no other circuits are occupying any of the links.

The initial routing results in the reservation of a λ-channel in each link along the route-pair assigned to each of the demands. This routing is advantageously performed without imposing a constraint of wavelength continuity. That is, the routing is carried out as though wavelength converters were available at every node. Because the initial link costs can be known a priori, it is convenient to tabulate, in advance, a list of all possible pairs of paths (also referred to herein as "route pairs") ordered by their corresponding (initial) lengths. The shortest route pairs are then readily selected from the list.

At block 80, all of the demands are arranged in some order, which is advantageously an arbitrary order. As represented in the figure, the total number of demands to be arranged is Δ. Routine 110, which includes blocks 85-100, represents a series of re-routing steps that are performed in order for each of the Δ demands. Thus, routine 110 contains Δ iterations of blocks 85-100. As indicated at blocks 90 and 100, the weights assigned to each of the links change during each of these iterations. Thus, the new minimum-length routes may differ from the previous minimum-length routes. The routing is again made subject to the requirement that working and protection paths be node-disjoint or, if node-disjoint paths are not found, that the working and protection paths be link-disjoint.

Routine 110 is itself iterated until a convergence criterion is met. One appropriate convergence criterion is that in the current iteration of routine 110, no demands are rerouted on different rings from the previous iteration. After convergence has been reached, the coloring procedure may be carried out, as represented by block 105 of FIG. 4 or block 50 of FIG. 2.

Before discussing blocks 85-100 of FIG. 4 in detail, it will be helpful to describe the exemplary cost function $y_{ij}(\phi_{ij}^n)$. In our notation, i and j identify a given link by indexing the nodes at its initial and final endpoints, respectively. The superscript n indexes each successive iteration of routine 110, and $\phi_{ij}^n$ represents the number of unidirectional λ-channels occupying link ij after the n'th iteration of routine 110.

The exemplary cost function $y_{ij}(\phi_{ij}^n)$ is given by the expression $$y_{ij}(\varphi_{ij}^n) = \frac{(c_{ij} + c_{ji}[1 + f_{ij}^n - f_{ji}^n]^+) \cdot \left(1 - \frac{\varphi_{ij}^n \bmod W}{W}\right)}{((\varphi_{ij}^n \bmod W) + 1)^t} + h_{ij}.$$

In the above expression, W represents the number of λ-channels that can be carried by a single fiber. Thus, whenever a fiber is filled, i.e., whenever the occupancy $\phi_{ij}^n$ of link ij reaches W, the value of the positive factor $$\left(1 - \frac{\varphi_{ij}^n \bmod W}{W}\right)$$

in the numerator of the above expression decays to 0, and the value of the positive factor $(\phi_{ij}^n \bmod W)+1)^t$ in the denominator of the above expression jumps down to 1.

Figure 5:
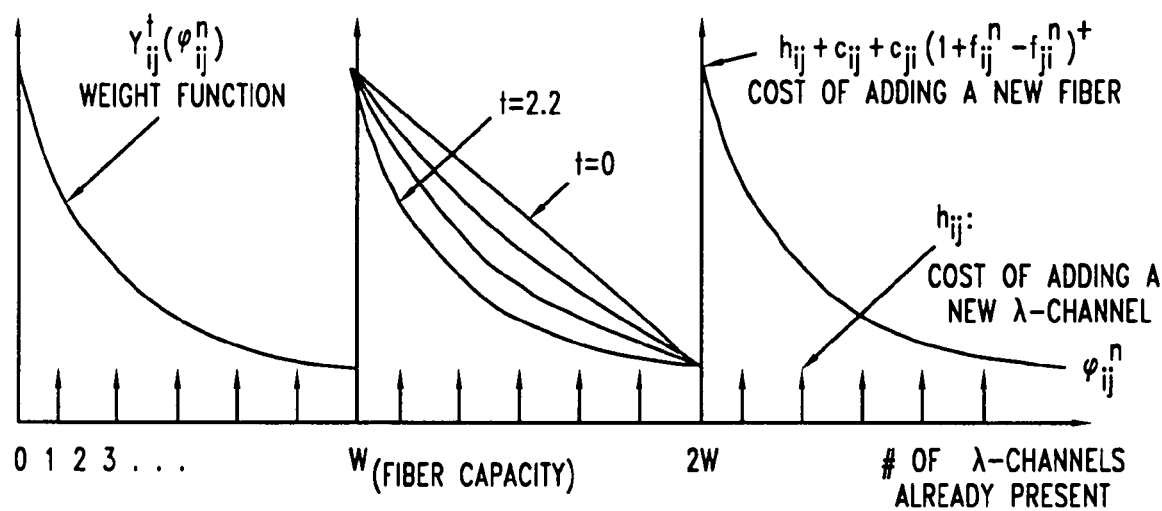
FIG. 5 is a graph of an exemplary cost function for computing link weights according to the invention in one embodiment.

This behavior is illustrated in FIG. 5, which represents the cost function for an illustrative link whose fibers each carry six λ-channels. It will be seen that when a fiber reaches full occupation, the cost function decays to a minimum value, which is the cost $h_{ij}$ of adding a new λ-channel. In terms of physical components, this cost typically includes the cost of the optical transceivers for sending and receiving signals at the new wavelength.

Initially, and just after each fiber has reached full occupation, the cost function assumes a maximum value, which includes, in addition to $h_{ij}$, the cost $c_{ij}$ of installing one new, unidirectional fiber strand on link ij in the forward direction i→j and the cost $c_{ji}[1+f_{ij}^n-f_{ji}^n]^+$ of installing a matching number of new, unidirectional fiber strands on the same link in the reverse direction j→i. The term $c_{ji}$ represents a single-fiber cost, the terms $f_{ij}^n$ and $f_{ji}^n$ represent, respectively, the number of forward-directed and the number of reverse-directed fibers installed between nodes i and j at the n'th iteration. The symbol [ . . . ]⁺ indicates that if the quantity within the brackets is negative, it should be replaced by zero. It should be noted that equality between $f_{ij}^n$ and $f_{ji}^n$ need not be required until the final iteration of routine 110.

The exponent t that appears in the denominator of the above expression for the cost function is an adjustable parameter that controls the decay profile of the cost function from its maximum to its minimum values. We have empirically determined that a fixed t-value of 2.2 gives good results. Alternatively, t can be varied by small increments over, e.g., the range 2-3 while iterating routine 110.

We have described a particular cost function $y_{ij}(\phi_{ij}^n)$ for purposes of illustration, and not for purposes of limitation. Other cost functions can be used without departing from the spirit and scope of the invention. However, it is especially advantageous to use a cost function which, like the $y_{ij}(\phi_{ij}^n)$ described above, decays toward a minimum value as the occupancy of the fiber that is currently being populated with λ-channels increases from zero toward full occupancy.

Turning again to FIG. 4, we will now describe the steps of routine 110 in greater detail. At block 85, the λ-channel previously assigned to the current (i.e., the i'th) demand is cleared on every link along the route previously assigned to demand i. At block 90, all of the link weights are updated in accordance with the new occupancy numbers resulting from the removal of demand i. At block 95, demand i is re-routed on the route pair that has the least length according to the latest set of link weights. At block 100, all of the link weights are again updated.

The coloring procedure, represented by block 105 of FIG. 4, is advantageously carried out in such a way as to minimize the number of wavelength converters that will be required, so that component hardware costs can be minimized. The coloring procedure is not needed if wavelength conversion is implicitly available at all nodes.

Figure 6:
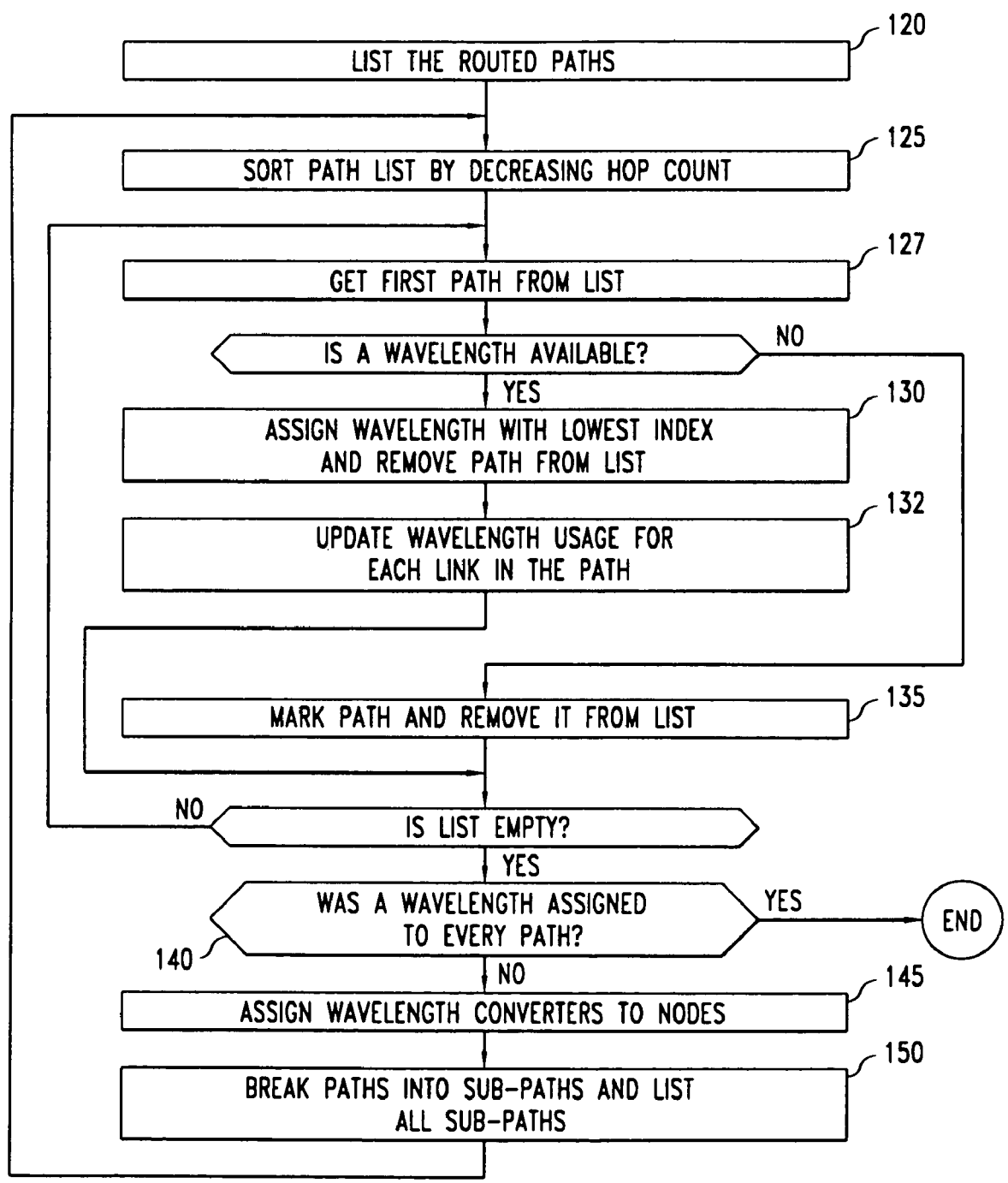
FIG. 6 is a flowchart of an exemplary procedure for assigning wavelengths to routed wavelength channels according to the invention in one embodiment.

One exemplary coloring procedure is illustrated in FIG. 6 and described below.

At block 120, all of the routed working circuits and protection circuits are listed. Multiple listings of the same circuit are permitted if the circuit represents multiple demands. The working and protection circuits are optionally constrained to use the same wavelength. Alternatively, they can be permitted to receive different wavelength assignments.

At block 125, the circuit list is sorted by decreasing number of hops. For each link and each fiber, a list of currently available wavelength channels is initialized with the maximum number (exemplarily, eighty) unused wavelengths.

At block 130, the first circuit currently in the list is removed from the list and the lowest-indexed available wavelength is assigned to all links on the circuit. All the fibers used by the circuit are marked as occupied by the assigned wavelength. If no wavelength is available, the circuit is marked as requiring a wavelength conversion, as indicated at block 135.

The procedure of blocks 130-135 is repeated until no circuits remain in the circuit list. If test 140 indicates that a wavelength was assigned to every circuit, the procedure ends. Otherwise, the procedure continues at block 145.

At block 145, the least number of wavelength converters is assigned to nodes, such that at least one wavelength converter is assigned to every circuit marked as requiring a wavelength conversion. Those skilled in the art will understand that standard techniques, referred to as "greedy heuristics" (which are used, for example, in solutions to the "set-covering problem") are known for making the required assignment of wavelength converters.

At block 150, those circuits marked as having wavelength assignments are broken into sub-circuits such that no sub-circuit has a wavelength converter at an intermediate node.

The procedure then returns to block 125, where the list of sub-circuits from block 150 is again sorted by decreasing number of hops. Blocks 125-150 are iterated until test 140 indicates that a wavelength was assigned to every circuit and the procedure ends.

If wavelength continuity is required, the procedure halts at block 140, without proceeding to block 145.

The procedures described above are readily carried out by special-purpose or general-purpose digital computational apparatus under the control of an appropriate hardware or software program.

According to an illustrative scenario for fault recovery in a WDM optical network having Dedicated Protection, a link failure is initially recognized by each end-node of the affected S-D pair. Then, the affected end-nodes effectuate switching from the working wavelength or wavelengths to the pertinent dedicated protection wavelength or wavelengths. For each affected wavelength, the equipment at the end-nodes carries out, e.g., an operation analogous to Automatic Protection Switching (APS) as known in the SONET and SDH hardware technologies. Using such technology, recovery can be effectuated within several tens of milliseconds. Alternatively, both the working circuit and its dedicated protection could simultaneously transmit. In such a case, call recovery could be instituted by continually selecting the better of the one or two signals received.

B. Shared Protection on Rings

The recovery of the network from a failure begins with fault recognition; i.e., when the endnodes of each demand affected by the failure recognize that a failure has occurred. Then, the switchover to protection wavelength channels is made. Each demand is mapped to a single ring; i.e., to a single pair of paths that are link-disjoint, and preferably node-disjoint. Because each demand is mapped to a single ring, it is not necessary to coordinate the recovery process among multiple rings. We believe that with currently available WDM network components, including optical cross-connects, a single ring can typically recover within 50-100 milliseconds.

In the preceding discussion, we have described a network design procedure for use when the wavelength channels assigned to a protection circuit are dedicated to the corresponding S-D pair and are not shared with the protection or working circuits of any other S-D pair. We refer to such a protection scheme as "Dedicated Protection."

We have devised a class of protection schemes alternative to Dedicated Protection. We refer to one such alternative scheme as "Shared Protection on Logical Rings." In that scheme, we group node pairs into logical DWDM rings, as we did for dedicated protection. However, we now permit a group of non-overlapping demands on the same ring to share protection wavelength channels. By using optical cross-connects, it is also possible to share protection wavelength channels across rings. However, the particular approach in which protection wavelength channels are shared across rings is not preferred, because it increases the complexity of network recovery when failures occur.

Shared Protection on Logical Rings can be applied in at least three different ring architectures, which we refer to, respectively, as: Correlated Wavelength Rings (CWR), Separated Fiber Rings (SFR), and Interconnected Fiber Rings (IFR). In the CWR architecture, neighboring rings are permitted to share fibers at the common links, but wavelength channels are not shared across rings for active or protection channels. In the SFR architecture, each ring uses only fibers dedicated to that ring. Because there is no sharing of fibers across rings, the SFR architecture does not need general-purpose optical cross-connects, and can instead use the less-expensive 2×2 wavelength-selective cross-connects. In the IFR architecture, it is not necessary to define the various rings of the network such that every demand can be routed within a single ring. Instead, a demand that spans, e.g., two rings interconnected by a common node can be divided into two parts, each routed within a respective one of the two interconnected rings. Optical cross-connects situated at the common nodes are readily used to effectuate the needed interconnection between rings. The IFR architecture has the advantage that it reduces the likelihood of creating rings that are relatively large in diameter but are packed with relatively few of the available wavelength channels.

Figure 7:
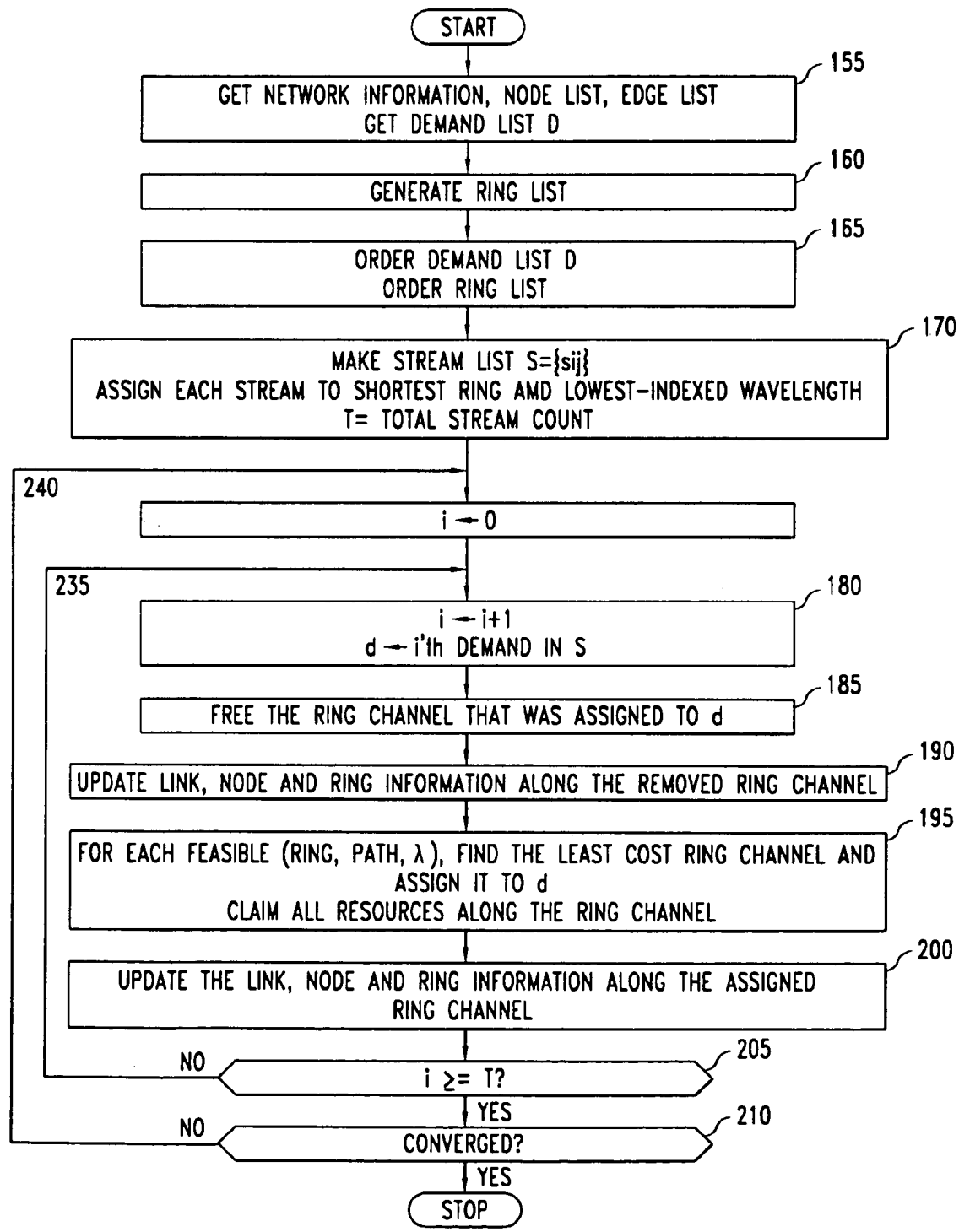
FIG. 7 is a flowchart describing an illustrative implementation of the invention as practiced for designing a network having a DP, CWR, or SFR architecture. The specific choice of architecture is determined by the choice of cost function.

With reference to FIG. 7, we will now describe an exemplary procedure for routing and wavelength assignment according to the scheme of Shared Protection on Logical Rings. The procedure of FIG. 7 is applicable to the CWR architecture, and in certain embodiments it also applies to the Dedicated Protection scheme described above.

According to the procedure of FIG. 7, paths and wavelength channels are assigned to demands in a manner that tends to drive down, and preferably to minimize, a cost function. The cost function takes different forms, according to whether the architecture is Dedicated Protection or CWR. Exemplary cost functions for these architectures will be described below.

Turning now to FIG. 7, the network information including lists of nodes and edges, and the demand list $D=\{d_{ij}\}$ are first obtained, as indicated at block 155. Then, at block 160, a set of shortest rings is obtained and placed in a ring list for each S-D pair between which there is a demand. Each such set consists of the first R shortest rings that pass through the source and destination nodes. Such a set is readily compiled by searching through a list of paths between the S-D pair, ordered by hop count. Alternatively, the k-shortest-cycle algorithm described in the copending and commonly assigned U.S. patent application Ser. No. 09/537,791, filed Mar. 29, 2000 by G. Liu, is advantageously used to compile such a set of R shortest rings for each S-D pair.

In this regard, the length of a ring, also referred to as the cycle length, may represent either the hop count or the aggregated length along the ring. The hop count is preferred if a port costs more than a unit length of fiber. Otherwise, the aggregated length is preferred.

At block 165, the demand list D is placed in decreasing order by the shortest cycle length of each demand. Also at block 165, all S-D pairs in the ring list are placed in a single, increasing order by hop count.

A ring channel is the combination of a ring, a path, and a wavelength channel assigned to a given unit demand. A stream $s_{ij}$ is a single unit of demand between S-D pair (i,j) to which a ring channel has been assigned. Block 170 represents the construction of a stream list $S=\{s_{ij}\}$, as explained below.

To construct the stream list S, the total demand between each S-D pair is decomposed into a set of unit demands, in which one "unit" is the capacity of one full wavelength channel. All of the unit demands, between all of the S-D pairs, are placed in an ordered list. Each unit demand is then assigned, in turn, to its shortest ring and to the lowest-indexed wavelength channel. Thus, all demand between a given S-D pair will be initially assigned to a single ring, and all demand between all S-D pairs will be initially assigned to a single wavelength channel. It should be noted that although initial ring assignments have been made, the respective streams have not been routed; that is, paths have not been assigned to the unit demands. The assignment of paths, when it is carried out, involves making a selection for each path between a clockwise and a counterclockwise path on the ring.

Although it is acceptable to randomly order the unit demands in stream list S, it is currently preferred to order the unit demands according to the following procedure: First, the S-D pairs between which there is demand are placed in decreasing order according to the shortest cycle length of each S-D pair. Then, a first sub-sequence is created by splitting off one unit demand for each S-D pair, and ordering the unit demands in the same order as their parent S-D pairs. Then, a second sub-sequence is created by splitting off a further unit demand, if available, for each S-D pair. The second sub-sequence is ordered the same way as the first sub-sequence, and then appended after the first sub-sequence. Further sub-sequences are created and appended in the same manner, until all of the unit demands belonging to each S-D pair have been exhausted.

Loop 235 of FIG. 7 results in the initial assignment or, in later iterations, the re-assignment of a ring channel to each unit demand, in turn. At block 175, the ordered stream list S is obtained. At each iteration of loop 235, a new stream is obtained from the ordered stream list S, as indicated at block 180. As indicated at block 205, loop 235 exits after the last demand in D has been processed.

Loop 240 of FIG. 7 represents a fine-tuning process in which the previously assigned ring channels are replaced by new ring channels in such a way as to minimize the network cost over all unit demands jointly. This joint process is carried out in a circulative manner by repeating all of the iterations of loop 235 until convergence is reached, i.e., until no further re-assignment of a ring channel will further reduce the total network cost.

Loop 235 begins at block 180 by getting the next demand d from the list S. If the current iteration is any iteration after the first, a ring channel has been assigned to d. If such a ring channel has been assigned, then at block 185 the assigned ring channel is cleared; that is, the corresponding assigned wavelength channel is deleted from all links and rings on which it was routed for demand d. At block 190, a list of wavelength-channel usage for each link, each node, and each ring is updated according to the result of block 185; i.e., the list is updated to reflect the removal of the ring channel corresponding to demand d.

At block 195, a new ring channel is assigned to d. For assignment to d, a ring channel is selected that minimizes the cost function. The cost function to be minimized is computed using the usage information as updated at block 200 of the previous iteration. If the assigned ring channel requires a new wavelength channel on the assigned ring, then a complete protection channel is assigned along the ring in the reverse direction. All necessary resources, including links, optical cross-connect ports, and wavelength channels, are claimed along the assigned path. At block 200, the list of link, node, and ring usage information is updated to reflect the new ring channel assignment.

Loop 240 is carried out by repeating loop 235 until convergence is indicated at test block 210.

We will now describe the cost function of block 195 of FIG. 7. The cost function, which we denote $COST(\lambda, r_{sd}^w, r_{sd}^p)$, depends upon the index $\lambda$ of the wavelength to be selected, the routed working path $r_{sd}^w$ from source node s to destination node d, and the routed protection path $r_{sd}^p$ from source node s to destination node d. (For brevity, the argument of the function COST will be omitted in some of the following discussion.)

Let i and j be the initial and final end nodes of a directed link in $r_{sd}^w$ or $r_{sd}^p$. Let $p_{ij}(w_{ij})$ be the channel cost function, to be described below, for the link (i,j). Let $w_{ij}$ be the total number of wavelength channels currently being used on the link (i,j). Then COST is given by the sum of $p_{ij}(w_{ij})$ over all links of $r_{sd}^w$, plus the sum of $p_{ij}(w_{ij})$ over all links of $r_{sd}^p$, plus the sum, over all initial links i of the working and protection paths, of a port cost function $C_i$.

The port cost function is advantageously devised to disfavor the inefficient use of cross-connects by giving a high cost to the first port of a new cross-connect, but a low cost to unused ports of existing cross-connects. For example, let each cross-connect have X ports. Then the cross-connects are fully utilized at a given node i if the total number $N_i$ of ports used at that node is a multiple of X; that is, when $N_i$ mod $X=0$. If xcost denotes the cost per cross-connect, then one exemplary cost function $C_i$, devised as described here, is equal to xcost×(1+1/X) if $N_i$ mod $X=0$, and is othewise equal to xcost/X.

The channel cost function $p_{ij}(w_{ij})$ is also advantageously devised to penalize the underutilization of a resource. In this case, however, the pertinent resource is the wavelength capacity of the link. Thus, it is advantageous to make $p_{ij}(w_{ij})$ at least partially depend on the number $w_{ij}$ of wavelength channels already present on link (i,j) according to a function $y_{ij}(w_{ij})$ whose shape is similar to the function $y_{ij}{}'(\phi_{ij}{}'')$ illustrated in FIG. 5.

Our exemplary channel cost function also depends upon the length $l_{ij}$ of link (i,j), and upon a cost factor G that depends upon the type of protection being implemented. G will be described in detail below. Our exemplary channel cost function is given by:

$$p_{ij}(w_{ij}) = l_{ij} y_{ij}(w_{ij}) \cdot G.$$

The function $y_{ij}(w_{ij})$, which we refer to as a fiber penalty function, is devised to encourage the use of an existing fiber, rather than the addition of a new fiber. As will be explained below, when shared protection is permitted, the function G is devised to encourage the use of an already-activated $\lambda$-channel rather than the addition of a new $\lambda$-channel.

We here define the integer n as the number of fibers already in use on a link. As noted, the integer W stands for the number of wavelength channels per fiber.

In the preceding expression, $y_{ij}(w_{ij})$ decreases as $w_{ij}$ increases from nW, corresponding to an empty fiber, to (n+1)W, corresponding to a fiber fully packed with wavelength channels. Thus, it is cheapest to assign a wavelength already assigned to the ring for protection, but not yet assigned to a working circuit. The cost penalty goes up whenever a completely new wavelength is assigned, and goes up even higher whenever a new fiber is added.

An exemplary form for the fiber penalty function is given by:

$$y_{ij}(w_{ij}) = \left[ \frac{1 - \frac{w_{ij} \bmod W}{W}}{(w_{ij} \bmod W + 1)^n} \right].$$

This function $y_{ij}(w_{ij})$ jumps to a maximum whenever $w_{ij}$ mod $W=0$; that is, whenever an existing fiber is filled and a new fiber must be added. Until the existing fiber is filled, however, the function $y_{ij}(w_{ij})$ is less for each successive wavelength channel that is added to the existing fiber.

We will now describe exemplary formulations for the cost factor G which, as noted, depends upon the protection strategy being implemented.

The Dedicated Protection strategy prohibits any sharing of wavelength channels for working paths or protection paths. Thus, the working and protection paths are equivalent, except of course that the working paths will normally be active and the protection paths inactive. Exemplarily, we assign the same cost factor G to both the working paths and the protection paths. An exemplary such cost factor for each link (i,j) is simply a constant value of 1.

In the Correlated Wavelength Rings strategy, each circuit is routed and protected in one of a given set of available rings. For any circuit, the length of the protection path of such circuit is simply the length of the ring in which the circuit has been routed. The protection path thus has a fixed cost that need not be included in the cost factor G.

Each working path must be routed on some ring r, and must be routed the shorter way or the longer way around the ring. Although the shorter way is generally preferred, routing the longer way around the ring might sometimes be advantageous for the purpose of balancing the load around the ring.

For routing the shorter way around the ring, an exemplary cost factor G is determined as follows: if the given wavelength channel is already in use for protection on ring r but no working path using the given wavelength channel currently occupies link $e_{ij}$, then the given wavelength channel is available to link $e_{ij}$, and G takes the value $$\frac{1}{M},$$

where M is defined as the sum of lengths of all links in the network, divided by the shortest link in the network. More generally, let u(r) be the number of protection wavelengths assigned to ring r, and let $v(r,e_{ij})$ be the number of working wavelengths already in use on ring r and link $e_{ij}$. Then: G takes the value 1 if $v(r,e_{ij}) \geq u(r)$ and link $e_{ij}$ belongs to ring r; G takes the value $$\frac{1}{M}$$

if $v(r,e_{ij}) < u(r)$ and link $e_{ij}$ belongs to ring r; and G takes an effectively infinite value if link $e_{ij}$ does not belong to ring r.

For routing the longer way around the ring, the exemplary cost factor G takes the values described above, multiplied by the length ratio of ring r to link (i,j).

We will now describe the strategy referred to as Separated Fiber Rings (SFR). In exemplary embodiments of SFR, the stream list is ordered and the ring list is prepared as described above for CWR. A List of Activated Fiber Rings (LAFR) is defined and initialized as an empty list. Let W be the total capacity of a fiber for wavelength channels Each fiber ring in the LAFR will have 2W wavelength channels, of which W channels are working channels and W channels are protection channels.

Each stream is taken, in sequence, from the stream list. If no ring currently in the LAFR is available to the current stream, the shortest cycle corresponding to the current stream is placed in the LAFR. In this regard, a ring is available if some path on the ring has sufficient resources to route the stream. For example, a ring is unavailable to a stream if one or both end nodes of the stream lie outside the ring, or if any link of the ring already has its W working channels fully occupied.

The current stream is then routed along the shortest available ring in the LAFR. This stream-routing procedure is repeated until all streams have been routed.

Then, a fine tuning procedure is carried out. According to such procedure, each stream is again selected in sequence. The current routes of the selected stream are cleared from the fiber ring currently occupied by the selected stream. Then the stream is re-routed along the shortest available path among all of the rings in the LAFR. This fine tuning procedure is repeated until no stream can find a shorter route than its current route. In this context, the length of a given route will typically be an appropriately weighted length or hop count.

The strategy that we refer to as Interconnected Fiber Rings (IFR) will now be described with reference to FIGS. 8-12. For simplicity of presentation, it will be assumed that wavelength conversion is available at all nodes of the network. In such a case, the assignment of wavelength channels to routed demands is straightforward and does not need further discussion.

Figure 8:
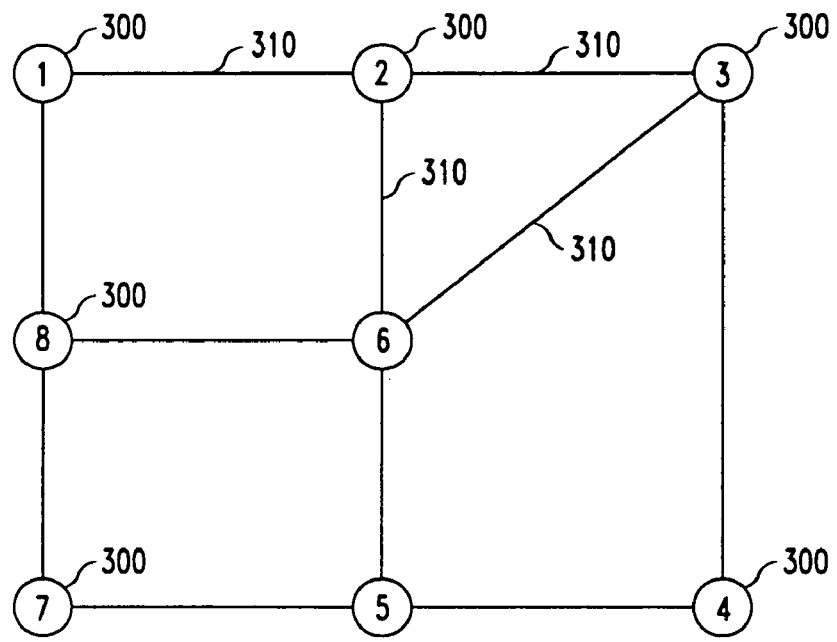
FIG. 8 is a schematic representation of a simple network in reference to which will be described the Intersecting Fiber Ring (IFR) strategy in an illustrative embodiment.

Shown in FIG. 8 is a network comprising nodes 300 and links 310. The nodes are numbered in the figure from 1 to 8. Initially, each total demand (i.e., not necessarily a unit demand) is routed along the shorter path of its shortest cycle. Length in this regard may be defined with reference to an appropriate link weighting function. After all of the demands have been routed along their shortest paths, a sufficient number of fibers is acquired on each link to support all of the demand routed on that link. The result is a working fiber network as illustrated, e.g., in FIG. 9. It will be noted that in the example of FIG. 9, different numbers of working fibers 315 are acquired by different links. That is, links 3-4, 4-5, and 5-6 have each acquired a single fiber, links 1-2, 1-8, 2-6, and ; have each acquired two fibers, and links 2-3, 3-6, 6-8, and 7-8 have each acquired three fibers.

Figure 11:
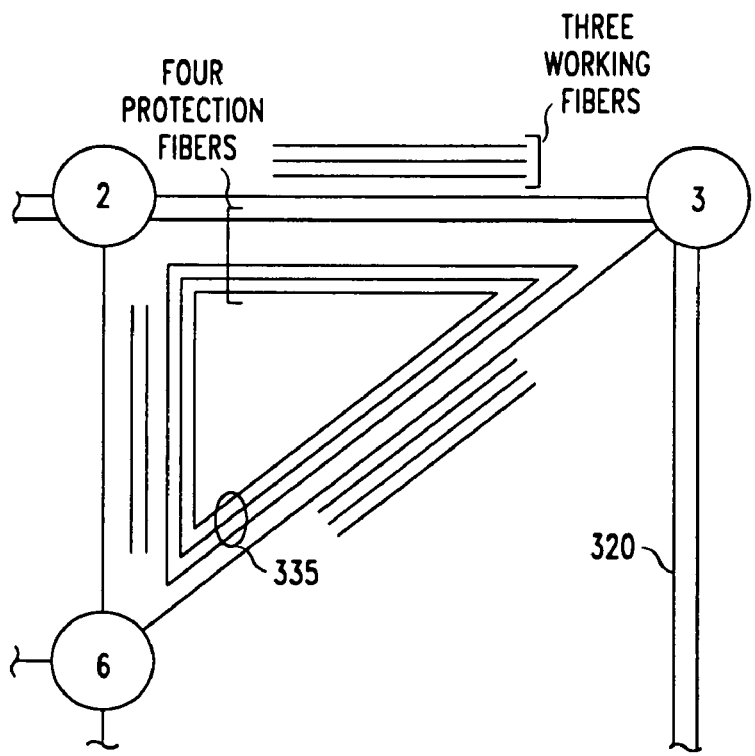
Figure 12:
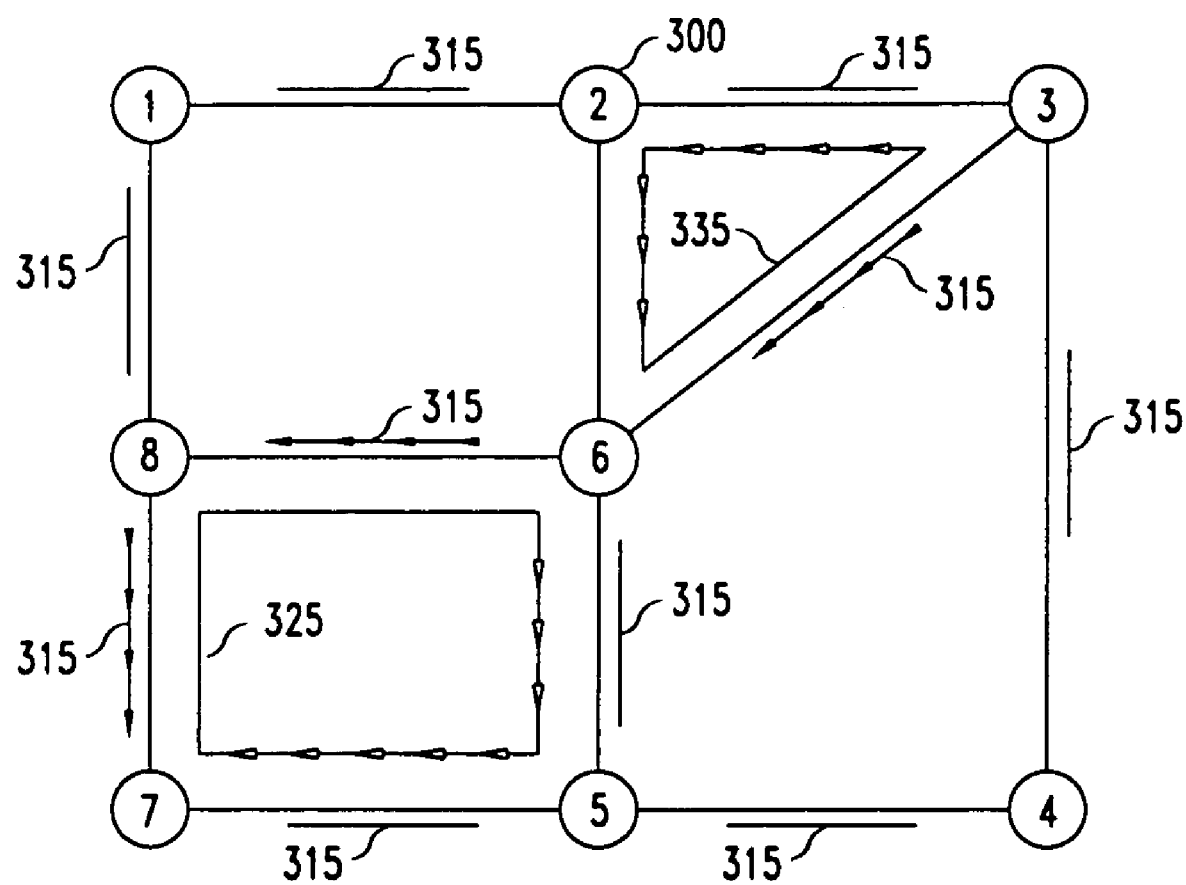
FIG. 12 illustrates the use of a protection path for recovery in the IFR architecture of FIGS. 9-11.

A set of protection fibers is acquired in addition to the working fibers. The protection fibers are acquired in rings, such as rings 320, 325, and 330 of FIG. 10. Significantly, sufficient protection fibers are acquired to cover all of the working fibers. In this regard, the set of protection rings covers the working fibers if, given a cut across any link of the network, the total number of protection fibers passing through the cut is at least the number of working fibers passing through the cut. The concept of covering is illustrated in FIG. 11, in which it is seen that there is a total of three working fibers on link 2-3, and a total of four protection fibers, distributed over two distinct protection rings, on the same link.

It is advantageous for the covering set of protection rings to be a minimal set, in the sense that the total fiber length over all protection rings is minimized.

Figure 9:
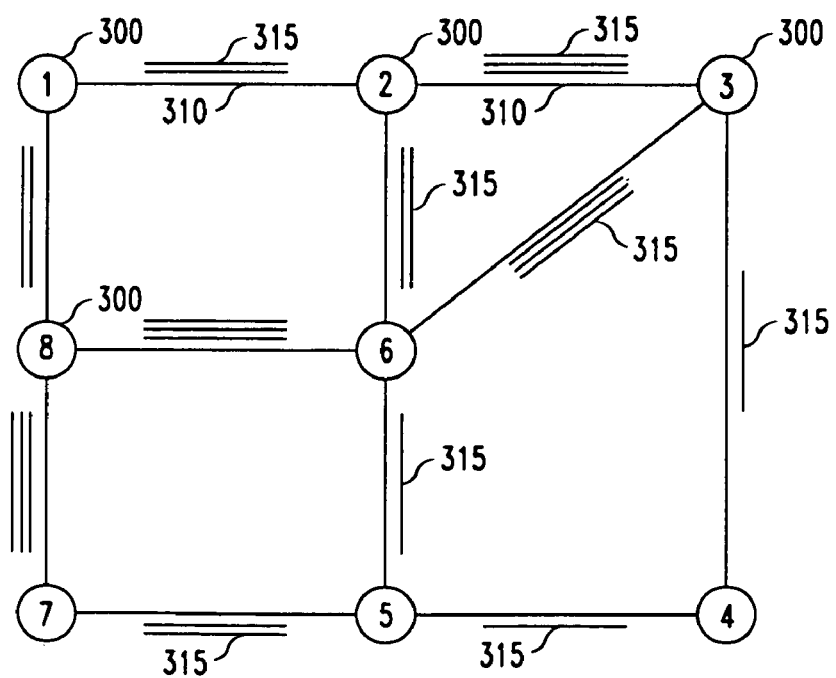
FIGS. 9-11 illustrate successive stages in an illustrative procedure for constructing an IFR architecture on the network of FIG. 8.
Figure 10:
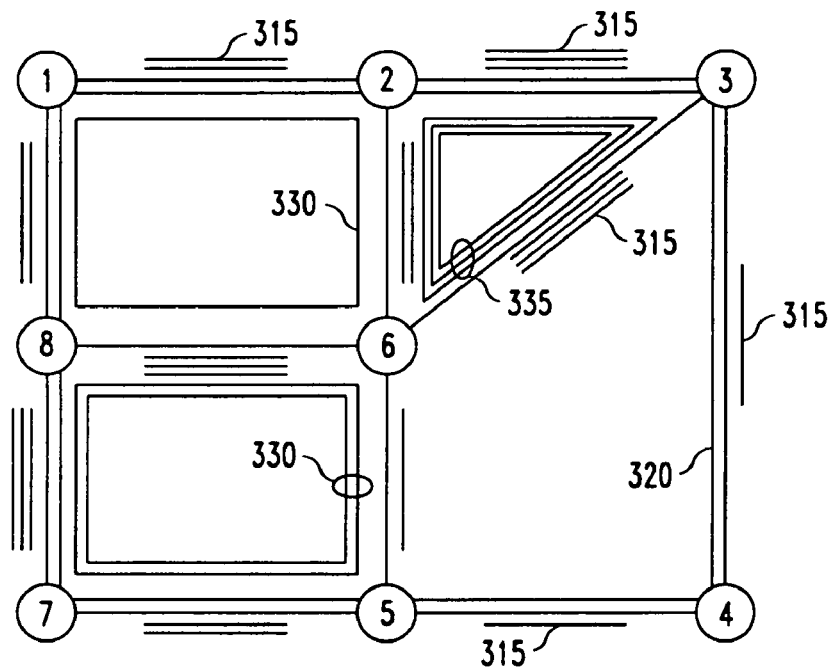

One useful method for generating a covering set of protection rings is provided by the Joint LCP Routing procedure of FIG. 4. When such a procedure is applied in the IFR context, each fiber in the working fiber network of, e.g., FIG. 9 is treated as an individual, single-hop demand.

After a covering set of protection rings has been defined, each working fiber on a given link is assigned to a particular one of the protection rings.

A recovery scheme is illustrated in FIG. 5. The demand 3-7 is routed on the working path 3-6, 6-8, 8-7. In case of a failure on the working path, the demand is routed over two covering rings, on the path 3-2, 2-6, 6-5, 5-7.

What is claimed is:

1. A method for routing demands on a network, wherein a plurality of rings comprising links and nodes can be logically defined in the network, each demand has a pair of endpoints at nodes of the network, each demand comprises one or more demand units, each link of the network comprises one or more optical fibers, and the method comprises:
- (a) listing for each demand one or more rings that each include the endpoints of said demand, each ring being explicitly defined before a working and protection path are defined on said ring;
- (b) evaluating for each listed ring a cost which depends on the occupancy of said ring by routed demand units;
- (c) selecting, for each demand unit, a ring from the pertinent list;
- (d) assigning working and protection paths for each demand unit on the ring selected for said demand unit; and
- (e) assigning to the working and protection paths for each routed demand unit a wavelength channel on an optical fiber on each link of the ring selected for said demand unit;

wherein no overlapping demands on any ring are permitted to share the same protection wavelength on the same optical fiber;

wherein the evaluating and selecting steps are carried out in a process that tends to minimize network cost over all routed demand units; and

- (f) employing an altered occupancy rating of said ring arising from the step (e) for a next iteration of the step (d).

2. The method of claim 1, wherein the assigning of said wavelength channel on said optical fiber is performed during the cost-minimizing process.

3. The method of claim 1, wherein the assigning of said wavelength channel on said optical fiber is carried out after the cost-minimizing process.

4. The method of claim 1, wherein the assigning of said wavelength channel on said optical fiber is carried out such that no protection path routed for one demand on a ring shares both its fiber and its wavelength channel, at any link, with a working or protection path routed for any other demand on said ring.

* * * * *